(12) United States Patent
Wright et al.

(10) Patent No.: US 11,768,065 B2
(45) Date of Patent: Sep. 26, 2023

(54) WEAPON CONTROL

(71) Applicant: BAE SYSTEMS plc, London (GB)

(72) Inventors: Julian David Wright, Preston (GB); Martyn John Hucker, Glascoed (GB); Benjamin Daniel Worrall, Glascoed (GB)

(73) Assignee: BAE SYSTEMS PLC, London (GB)

( * ) Notice: Subject to any disclaimer, the term of this patent is extended or adjusted under 35 U.S.C. 154(b) by 34 days.

(21) Appl. No.: 17/753,340

(22) PCT Filed: Aug. 13, 2020

(86) PCT No.: PCT/GB2020/051925
§ 371 (c)(1),
(2) Date: Feb. 28, 2022

(87) PCT Pub. No.: WO2021/044113
PCT Pub. Date: Mar. 11, 2021

(65) Prior Publication Data
US 2022/0290959 A1 Sep. 15, 2022

(30) Foreign Application Priority Data

Sep. 6, 2019 (GB) .................................... 1912829

(51) Int. Cl.
*F42C 15/40* (2006.01)
*B64C 39/02* (2023.01)
*B64U 101/15* (2023.01)

(52) U.S. Cl.
CPC ............ *F42C 15/40* (2013.01); *B64C 39/024* (2013.01); *B64U 2101/15* (2023.01)

(58) Field of Classification Search
CPC .... F42C 15/40; B64C 39/024; B64U 2101/15
See application file for complete search history.

(56) References Cited

U.S. PATENT DOCUMENTS

| 8,857,312 | B2 | 10/2014 | Nelson et al. |
| 9,410,783 | B1 | 8/2016 | Khuc et al. |
| 2019/0107374 | A1 | 4/2019 | Hill |

FOREIGN PATENT DOCUMENTS

| CN | 107021224 A | 8/2017 |
| EP | 3489138 A1 | 5/2019 |
| WO | 2021044113 A1 | 3/2021 |

OTHER PUBLICATIONS

International Preliminary Report on Patentability received for PCT Application No. PCT/GB2020/051925, dated Mar. 17, 2022. 6 pages.
International Search Report and Written Opinion received for PCT Application No. PCT/GB2020/051925, dated Nov. 4, 2020. 12 pages.
GB Search Report under Section 17(5) received for GB Application No. 1912829.7, dated Mar. 3, 2020. 3 pages.

*Primary Examiner* — Michael D Lang
(74) *Attorney, Agent, or Firm* — Finch & Maloney PLLC

(57) ABSTRACT

The present invention relates to the control of weapons, particularly weapons which are controlled via a communications link, possibly at some distance from the weapon's location. The invention is to an apparatus comprising safety-critical and non-safety-critical functional parts wherein at least one of a plurality of safety-critical functional parts is only connected to at least one other of the plurality of safety-critical functional parts.

14 Claims, 1 Drawing Sheet

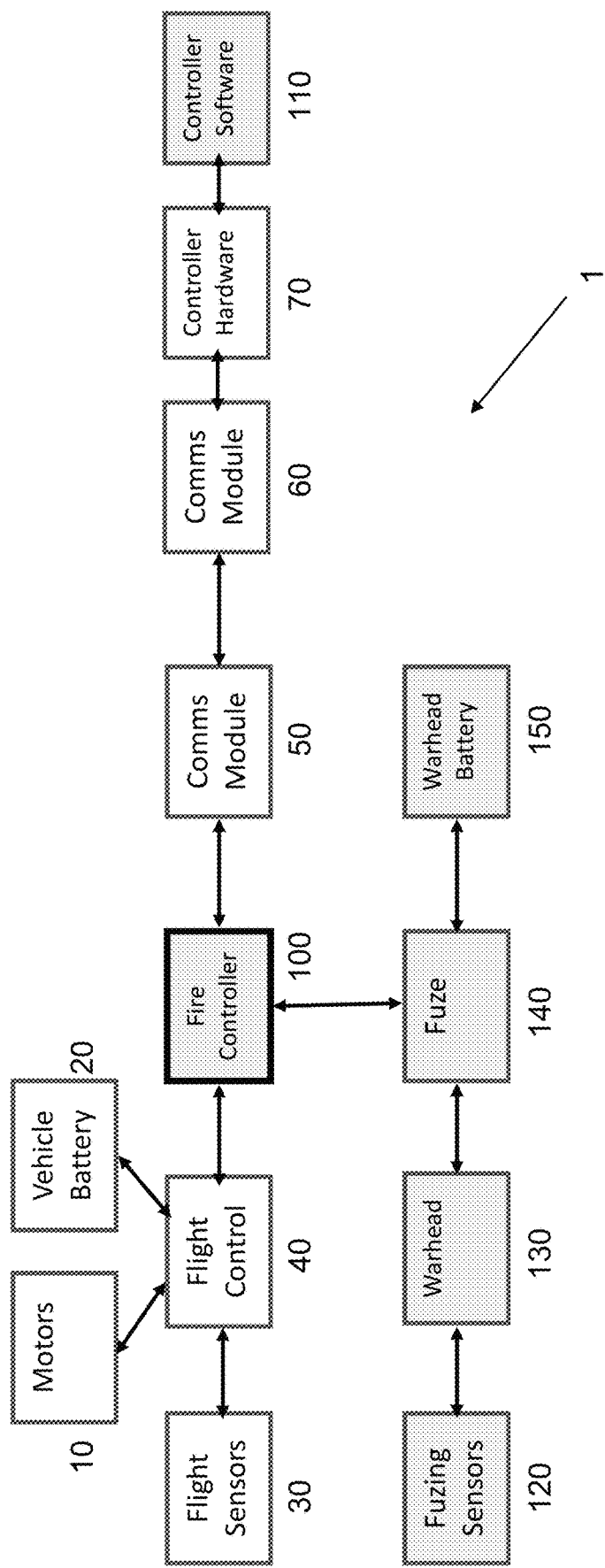

WEAPON CONTROL

The present invention relates to the control of weapons, particularly weapons which are controlled via a communications link, possibly at some distance from the weapon's location.

There are many types of weapon which are deployed and then remotely triggered to cause a detonation of explosives included in the weapon.

In military parlance, a fuze is a device designed to initiate a main charge. Once a weapon is armed, it is ready to be detonated (by the fuze). Once an additional input is received, an armed weapon is detonated. This two-step approach is adopted for safety reasons to ensure that a weapon is not accidentally detonated or, at least, it is not easy to do so.

In electronic military systems, the use of higher specification components is usually mandated. Such components are subject to more rigorous specification and testing, with the aim being to ensure that a very high degree of reliability and performance is expected. Such components are usually termed Military-Specification/Specified and abbreviated to MilSpec.

However, the testing and specification required has a cost implication, meaning that MilSpec components can be significantly more expensive than similar components which are not so specified. Such non-military components are commonly referred to as Commercial Off-the-Shelf (COTS) components. COTS components may, in principle, be specified to be functionally identical to equivalent military specified parts.

If a military device, whether a vehicle, weapon or other complex electronic system, uses MilSpec components, the entire device is usually certified as an entire unit. If a single component is altered, then recertification of the entire device may be necessary. This can be expensive and time consuming.

Advances in technology typically result in improved performance and reduced cost for all components. However, MilSpec components typically take longer to be recertified and so there is an inevitable time lag if such components are used compared to COTS components.

Embodiments of the present invention aim to address issues associated with the use certain classes of components, such as COTS and MilSpec components.

According to the present invention, there is provided an apparatus comprising safety-critical and non-safety-critical functional parts wherein at least one of a plurality of safety-critical functional parts is only connected to at least one other of the plurality of safety-critical functional parts.

In an embodiment, the safety-critical functional parts comprise MilSpec components.

In an embodiment, the non safety-critical functional parts comprise Commercial Off the Shelf, COTS, components.

In an embodiment, the at least one of the plurality of safety-critical functional parts is a fuze.

In an embodiment, the fuze is connected to a fire controller, operable to ensure that only suitable commands are passed to the fuze and to maintain failsafe behaviour.

In an embodiment, the fire controller is further connected to non safety-critical functional parts.

In an embodiment, the apparatus is a vehicle.

In an embodiment, the vehicle is an Unmanned Aerial Vehicle, UAV.

In an embodiment, the vehicle comprises a platform and a weapon.

In an embodiment, the platform comprises non safety-critical functional parts.

In an embodiment, the weapon comprises safety-critical functional parts.

For a better understanding of the invention, and to show how embodiments of the same may be carried into effect, reference will now be made, by way of example, to the accompanying diagrammatic drawings in which:

FIG. 1 shows a schematic of a UAV according to an embodiment of the present invention.

As an example, the present application will refer to an Unmanned Aerial Vehicle (UAV), which is adapted to act as a guided weapon. UAVs are widely available and represent an area where technology is rapidly developing in the commercial world. The use of UAV technology in military application has previously been limited to, for instance, reconnaissance applications.

However, there is a desire to leverage the easy availability and relatively lower cost of UAV devices in order to provide a platform for a guided weapon. However, the use, as a weapon platform, of a UAV manufactured using COTS components is typically not allowed or involves substantial difficulty.

Embodiments of the invention seek to subdivide functions of the device into two broad categories: a first related to safety-critical function; and a second not related to safety-critical functions. In this context, "safety-critical" refers to functions related to arming or triggering an explosive device or other potentially lethal effector. "Non safety-critical", in this context, refers to other functions of a device not directly related to the arming or triggering of an explosive device or other potentially lethal effector.

FIG. 1 shows a block diagram schematic of a UAV 1 according to an embodiment of the invention. The UAV 1 comprises a number of different functional parts. Some of these comprise COTS components and are subject to a lesser degree of testing and certification, although in most circumstances a user will wish to be assured of their general reliability and availability. Other functional parts belong to safety-critical systems and are therefore formed from MilSpec components. They may be exclusively formed from such components or certain key sub-parts may be designated to be formed from MilSpec components only.

In FIG. 1, the functional units formed from COTS components are shown in non-shaded form and the functional units formed from MilSpec components are shown in shaded form.

In the specific example of a UAV acting as a guided weapon platform, certain functional parts correspond broadly to functional parts which could equally be present in a commercial or hobbyist UAV. As such, only brief descriptions of these parts are included herein.

The UAV 1 may be considered to comprise the platform and the weapon. The platform includes the parts formed from COTS components and the weapon includes the parts formed from MilSpec components. As such, the platform comprises all parts 10, 20, 30, 40, 50, 60, 70. The weapon comprises all parts 100, 110, 120, 130, 140, 150.

The platform typically comprises a rotary wing device, such as a hexacpoter or quadracopter, although other forms of UAV may be used as required. In any event, the example of a UAV here is exemplary only and other types of vehicle and, indeed, device may be relevant.

The UAV 1 comprises at least one motor 10 which provide propulsive force to the rotors. Power for the motors and other systems is provided by a battery 20.

The motors 10 are controlled by a flight controller 40. This may include navigation and other control functions. The flight controller 40 receives inputs from one or more flight sensors, which may include altitude and/or GPS sensors and the like to provide positional information.

The flight controller 40 is connected to a fire controller 100 which will be described in more detail later.

The fire controller 100 is connected to a comms module 50 which is operable to receive/transmit commands from/to a remote system.

The remote system comprises a comms module 60 which communicates with comms module 50 onboard the UAV 1. The remote comms module 60 is operable in cooperation with a Controller formed from hardware 70 and software 100 elements.

The fire controller 100 is a safety critical unit which ensures that suitable commands are sent to a fuze 140 in such a way that if any communications fail anywhere in the system, then safe behaviour is achieved or preserved. The fuze 140 is the part which causes the warhead 130 be triggered and is critical in ensuring the safety of the system. To this end, there are no COTS components directly connected to the fuze 140. The only components connected to the fuze are the flight controller 100, the warhead battery 150 (which is separate to the vehicle battery 20) and the warhead 130 itself. The fuze 140 is effectively firewalled from COTS components by MilSpec components.

The warhead 130 is further connected to fuzing sensors 120. The fuzing sensors way take the form of e.g. a proximity sensor.

In this particular example, the exact composition of the warhead and the sensors used therewith are not key to understanding the invention.

The skilled person will understand that the UAV 1 described herein comprises certain parts which are safety critical and certain parts which are not. The exact nature of either is not critical to understanding the present invention. Rather, it is the interaction between the two which is important.

The fuze 140, which comprises MilSpec components, is connected only to other units which comprises MilSpec components. The fire controller 100 is the only means by which commands can be issued to the fuze 140 and it is formed from MilSpec components, to provide a required degree of certainty regarding its operation and to assist in ensuring that no errant signals can be issued which could result in unsafe or unwanted operation of the fuze 140 and, hence, the warhead 130. The fire controller is arranged to operate in a failsafe manner i.e. if it fails, then no commands can be issued to the fuze which could cause a detonation of the warhead 130.

Commands between the two comms modules 50, 60 are encrypted such that critical commands, such as "arm warhead" are rendered suitably safe.

The controller software 110 is prepared such that it complies with any suitable requirements such that it can be certified according to any software standards which might apply.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An aerial vehicle, comprising:
a communications module operable to wirelessly receive commands from a remote system;
an apparatus including safety-critical functional parts, wherein the safety-critical functional parts are only connected to one or more other safety-critical functional parts, wherein the safety-critical functional parts comprise MilSpec (military-specification) components, at least one of the safety-critical functional parts being related to arming or triggering a weapon; and
a fire controller communicatively coupled to the apparatus, and operable to receive commands received by the communications module and to issue corresponding commands to the apparatus, wherein in response to a failure mode no commands can be issued by the fire controller to the apparatus.

2. The aerial vehicle of claim 1, wherein the vehicle is an unmanned aerial vehicle (UAV), and wherein the at least one of the safety-critical functional parts include a fuze, the apparatus further comprising: a fuzing sensor; a battery; and/or a war head.

3. The aerial vehicle of claim 1, wherein the apparatus includes non-safety-critical functional parts.

4. The aerial vehicle of claim 3, wherein the non-safety-critical functional parts comprise commercial-off-the-shelf (COTS) components.

5. The aerial vehicle of claim 1, wherein the at least another of the safety-critical functional parts is a fuze.

6. The aerial vehicle of claim 5, wherein the fuze is connected to the fire controller that is further operable to selectively pass commands to the fuze and to maintain failsafe behavior.

7. The aerial vehicle of claim 1, wherein the fire controller is further connected to non-safety-critical functional parts.

8. The aerial vehicle of claim 1, wherein the aerial vehicle is an unmanned aerial vehicle (UAV).

9. The aerial vehicle of claim 1, wherein the ariel vehicle comprises a platform and a weapon.

10. The aerial vehicle of claim 9, wherein the platform comprises non-safety-critical functional parts.

11. The aerial vehicle of claim 9, wherein the weapon includes the safety-critical functional parts.

12. The aerial vehicle of claim 1, wherein the weapon is a lethal effector.

13. The aerial vehicle of claim 1, wherein the weapon is an explosive device.

14. The aerial vehicle of claim 1, wherein the apparatus includes non-safety-critical functional parts that are not directly related to arming or triggering of the weapon.

* * * * *